June 13, 1944.  J. LEDWINKA  2,351,573
BRAKE MECHANISM
Original Filed Nov. 14, 1941
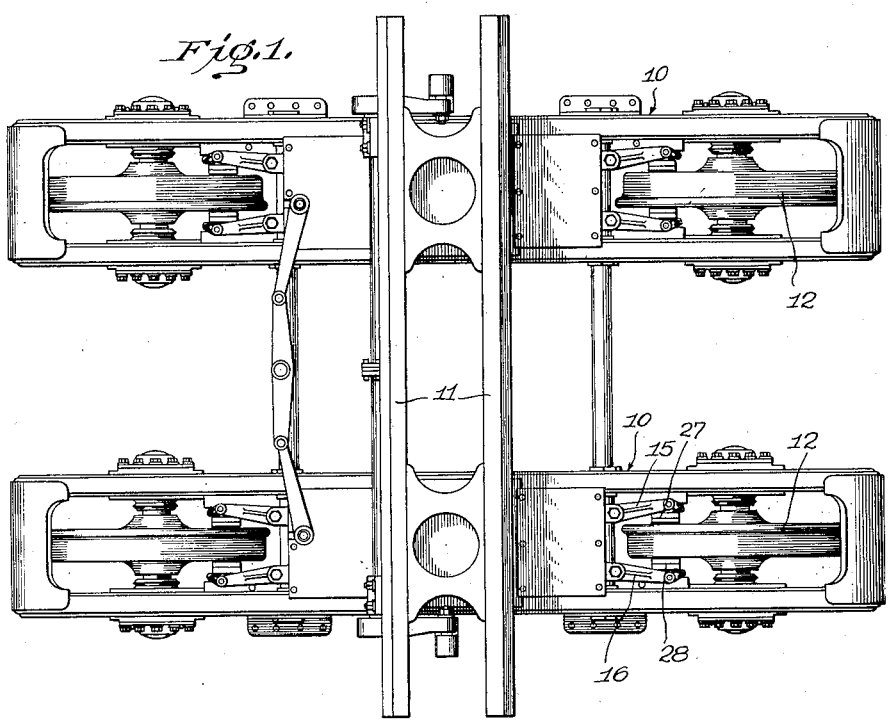
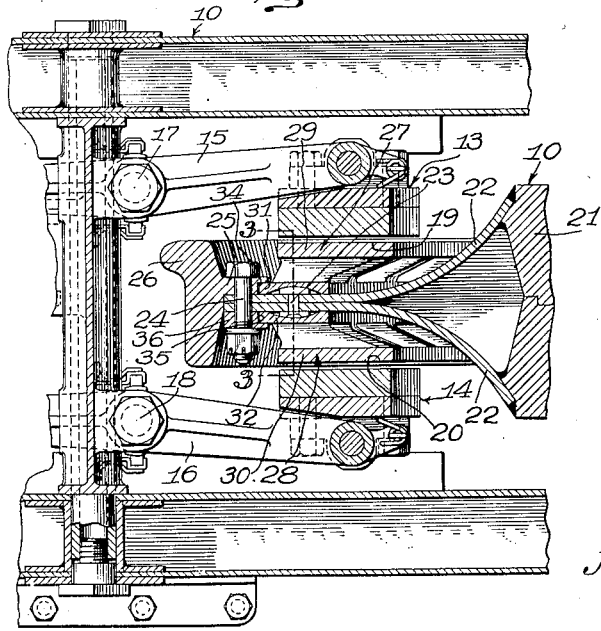
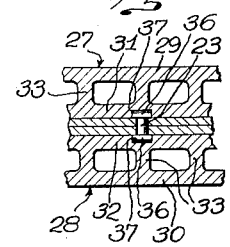
INVENTOR
Joseph Ledwinka
BY John P. Tarbox
ATTORNEY Patented June 13, 1944

2,351,573

UNITED STATES PATENT OFFICE 2,351,573

BRAKE MECHANISM

Joseph Ledwinka, Philadelphia, Pa., assignor to Budd Wheel Company, Philadelphia, Pa., a corporation of Pennsylvania Original application November 14, 1941, Serial No. 419,116. Divided and this application January 20, 1942, Serial No. 427,408

7 Claims. (Cl. 188—218)

The invention relates to brake mechanisms and more particularly to a rotary brake part or parts associated with a wheel to be braked.

This application is a division of application Serial No. 419,116, filed November 14, 1941.

It is an object of the invention to provide a readily assembled arrangement of a rotary brake part or parts with the wheel to be braked and one which allows free expansion and contraction of the rotary part or parts without stressing the wheel with which it is associated.

This object is in large part attained by mounting the rotary brake parts on opposite sides of the wheel body in such manner that they are free to expand and contract radially under varying conditions of temperature and by providing a driving connection between the wheel and rotary brake parts which permits such contraction and expansion while maintaining at all times a firm driving connection between the wheel proper and the brake parts.

Other and further objects and advantages and the manner in which they are attained will become apparent from the following description when read in connection with the drawing forming a part thereof.

In the drawing:

Fig. 1 is a plan view of a truck showing the brake mechanism of the invention applied thereto.

Fig. 2 is an enlarged sectional fragmentary plan view through the brake mechanism and wheel, the section being taken substantially in a horizontal plane passing through the axis of the wheel.

Fig. 3 is a detail sectional view taken substantially along the line 3—3 of Fig. 2.

The brake mechanism of the invention is shown applied to a truck structure of the type shown in the copending application Serial No. 417,991, filed November 6, 1941, in which the two trucks, as 10, are individually pivotally connected to the car body represented by the bolster sills 11 intermediate their ends and carry, adjacent their ends the independently rotatable wheels as 12. Since the brake mechanism associated with the respective wheels is substantially the same for each, only one such mechanism is illustrated in detail and the description will be limited thereto.

The brake mechanism associated with each wheel may comprise, as shown in the parent application, a pair of brake shoes 13 and 14 disposed on opposite sides thereof and pivotally mounted on brake levers 15 and 16 mounted on the truck on vertical pivots 17 and 18 the levers being suitably actuated as by a brake cylinder (not shown) to bring the brake shoes into braking engagement with radial braking faces 19 and 20 provided on opposite sides of the wheel. The detail of the mounting and actuation of the brake shoes need not be described herein, since the present invention is concerned primarily with the wheel and the brake mechanism associated therewith.

The wheel 10 may comprise, as shown, a hub 21 to which are secured, as by welding, at widely axially spaced locations, the two dished discs 22 constituting the body of the wheel. At their outer periphery the discs 22 lie face to face and are secured together as by an annular series of rivets, as 23, and also an annular series of bolts, as 24, securing the radially inwardly extending flange 25 of the rim 26 seated on the periphery of the wheel body, to the wheel body. For maximum braking two annular brake rings 27 and 28 are provided, one secured on each side of the wheel, but it will be understood that in some cases one ring and one shoe will provide sufficient braking.

To provide ease of fabrication and adequate cooling, each ring 27 or 28 may comprise a cast member having a continuous outer annular ring 29 or 30 provided with a braking face, as 19 or 20, and an axially spaced, radially offset inner attaching ring, as 31 or 32, the latter being of larger external diameter and internal diameter than the former, the two rings, as 29 and 31, being interconnected by radial vanes or braces, 33, forming with the rings radial passages for the cooling air, which is sucked into these passages at their open inner ends and discharged centrifugally through their outer ends.

Brake ring 27 is loosely or floatingly held to the adjacent side of the wheel to allow for its radial expansion or contraction under the varying conditions of temperature, by having the outer periphery of its attaching ring 31 received in an annular recess 34 in the rim flange 25.

The opposite ring 28 has its attaching ring 32 similarly received in an annular recess 35 formed in a clamping ring 36 for clamping the wheel body to the rim flange by the tightening of the securing bolts 24.

As shown in Fig. 2 these recesses 34 and 35 are of a depth to allow radial expansion of the brake rings under the heat developed by the braking. Their axial depth is such as to hold the attaching rings with but a light clamping pressure not substantially interfering with this desired freedom to expand and yet sufficient to prevent looseness of parts and resultant rattling.

To lock the brake rings so as to rotate with the wheel and yet allow the radial expansion, the rivets 23, see Figs. 2 and 3, are provided with radially elongated heads 36' which are extended into shallow grooves or pockets 37 in the inner faces of the attaching rings. As shown, both the bottoms of the grooves and the axially outer faces of the heads may be of a slight but corresponding curvature, which tends to hold the rings centered with respect to the axis of the wheel. It also avoids extending the grooves to the inner periphery of the ring where dirt could enter them.

Though only a single form of the invention is illustrated and described, the invention is not limited thereto but may be embodied in various forms as desired. As various changes in construction and arrangement of the parts may be made without departing from the spirit of the invention as will be apparent to those skilled in the art, reference will be had to the appended claims for a definition of the limits of the invention.

What I claim is:

1. In a brake mechanism, a wheel to be braked having a body and a rim seated on the periphery of said body and having an inwardly extending recessed flange overlapping said body, means for securing said body and flange together, a brake ring floatingly secured in the recess of said flange and a driving connection between said ring and wheel.

2. In a brake mechanism, a wheel to be braked having a body, a rim seated on the periphery of said body and having an inwardly extending recessed flange overlapping said body, a recessed clamping ring engaging the face of the wheel body opposite said flange, means for securing said flange, wheel body and ring, brake rings floatingly secured in the recesses of said flange and clamping ring and driving connections between said brake rings and wheel.

3. In a brake mechanism, a wheel body, a brake ring, means for securing said ring to said body so as to permit relative radial expansion and contraction of said ring on said body, and means secured to said body and extending into pockets formed in the face of said ring to prevent relative rotation between said ring and said body.

4. In a brake mechanism, a wheel body formed of separate discs, a brake ring, means for securing said ring to said body so as to permit relative radial expansion and contraction of said ring on said body, and means securing said discs together and extending into pockets formed in said ring to prevent relative rotation between said ring and said body.

5. In a brake mechanism, a wheel body, an outer braking ring, an inner fastening ring radially offset and axially spaced from said braking ring, vanes connecting said rings together constructed to form radial passages for cooling air drawn therethrough by centrifugal force upon rotation of said wheel body, and means for securing said fastening ring to said body.

6. In a brake mechanism, a wheel body, a braking ring having a separate inner fastening ring radially offset and axially spaced therefrom, means for securing said inner fastening ring to the wheel body so as to permit relative expansion and contraction thereof, and vanes forming passages for cooling air connecting said braking ring and inner fastening ring together.

7. In a brake mechanism, a wheel to be braked having a rim and including means forming a radially extending recess, a brake ring mounted on said wheel with the edge of said ring located in said recess and having radially elongated pockets in the face adjacent the wheel, and means on said wheel engaging in said radially elongated pockets to prevent relative rotation between said wheel and ring while permitting free radial expansion and contraction of said ring.

JOSEPH LEDWINKA.